(12) United States Patent
Yang et al.

(10) Patent No.: US 8,321,707 B2
(45) Date of Patent: Nov. 27, 2012

(54) MAIN COMPUTER FOR VEHICLE AND POWER MANAGEMENT METHOD THEREOF

(75) Inventors: Ming-Jer Yang, Taoyuan County (TW); Chun-Sheng Chao, Taoyuan County (TW); Chao-Feng Wan, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 511 days.

(21) Appl. No.: 12/261,070

(22) Filed: Oct. 30, 2008

(65) Prior Publication Data

US 2009/0119528 A1  May 7, 2009

(30) Foreign Application Priority Data

Nov. 2, 2007 (TW) .............................. 96141541 A (51) Int. Cl.
G06F 1/26 (2006.01)
(52) U.S. Cl. ......... 713/323; 713/324; 713/330; 713/340
(58) Field of Classification Search .................. 713/323
See application file for complete search history.

(56) References Cited

U.S. PATENT DOCUMENTS

| | | | | |
|---|---|---|---|---|
| 6,252,406 B1* | 6/2001 | Tegge et al. | ................... | 324/427 |
| 6,442,702 B1* | 8/2002 | Ishikawa et al. | ............. | 713/340 |
| 6,944,779 B2* | 9/2005 | Alexander et al. | ............ | 713/300 |
| 7,386,853 B2* | 6/2008 | Hanzawa | ....................... | 718/108 |
| 7,701,167 B2* | 4/2010 | Yamaguchi | ................... | 320/104 |
| 2005/0222725 A1* | 10/2005 | Homma et al. | ................. | 701/36 |
| 2006/0117131 A1 | 6/2006 | Schneider | | |
| 2006/0170536 A1* | 8/2006 | Yu et al. | ..................... | 340/426.1 |
| 2008/0215908 A1* | 9/2008 | De Haas et al. | ............... | 713/502 |
| 2008/0301481 A1* | 12/2008 | Cheng | ........................... | 713/323 |
| 2010/0141431 A1* | 6/2010 | Boss et al. | ............... | 340/539.13 |
| 2010/0229017 A1* | 9/2010 | Ito | ................................ | 713/340 |

FOREIGN PATENT DOCUMENTS

| | | |
|---|---|---|
| CN | 1100287 C | 1/2003 |
| CN | 1550664 A | 12/2004 |
| CN | 1692322 A | 11/2005 |
| CN | 100339797 C | 9/2007 |

OTHER PUBLICATIONS

Office action mailed on Oct. 21, 2011 for the Taiwan application No. 096141541, filed Nov. 2, 2007, p. 1-4.

* cited by examiner

*Primary Examiner* — Ryan Stiglic
(74) *Attorney, Agent, or Firm* — Winston Hsu; Scott Margo (57) ABSTRACT

A main computer for vehicle includes a central processing unit and a programmable logic device. The central processing unit is configured for controlling operations of the main computer. The programmable logic device is coupled to the central processing unit and includes a built-in power state machine for managing power statuses of the main computer. The power state machine includes a turn-off status, an operating status, and a predetermined status located between the turn-off status and the operating status.

19 Claims, 4 Drawing Sheets

MAIN COMPUTER FOR VEHICLE AND POWER MANAGEMENT METHOD THEREOF

BACKGROUND OF THE INVENTION

1. Field of the Invention

The present invention relates to a main computer for a vehicle and a power management method thereof, and more particularly, to a main computer, which has a power state machine built-in to a programmable logic device and uses the power state machine to manage the power status of the main computer, and a power management method thereof.

2. Description of the Prior Art

Recently, the subject of car PCs has become popular with the increase in requirements for car equipment. The car is no longer merely a vehicle and is a digital entertainment center. For example, GPS navigation systems, reverse gear cameras, in-car digital TVs or DVD players, Internet browsers, phone calls, etc. have already become fundamental car equipments in present day vehicles.

For this reason, how to provide a car PC with low power consumption, high efficiency, and diversified applications to satisfy various demands of users has become one of the most important topics in designing car PC. At present, a power control system of the car PC is implemented by software. It wastes much time to restart the car PC, and there are often crashes or unstable situations, which are inconvenient and troublesome to users.

SUMMARY OF THE INVENTION

It is one of the objectives of the claimed invention to provide a main computer for vehicle and related power management method to solve the abovementioned problems.

According to an exemplary embodiment of the present invention, a main computer for vehicle is provided. The main computer includes a central processing unit and a programmable logic device. The central processing unit is configured for controlling operations of the main computer. The programmable logic device is coupled to the central processing unit. The programmable logic device has a built-in power state machine for managing power statuses of the main computer. The power state machine comprises a turn-off status, an operating status, and a predetermined status located between the turn-off status and the operating status.

In one embodiment, the predetermined status is an idle status. When the programmable logic device receives a main computer power off signal, the power state machine transits from the operating status into the idle status. When a time during staying in the idle status is greater than a first predetermined time, the power state machine transits from the idle status into the turn-off status. When a time during staying in the idle status is smaller than a first predetermined time and the programmable logic device receives a main computer power on signal, the power state machine transits from the idle status into the operating status.

In one embodiment, the predetermined status is a battery fault and process status. When a supply voltage of the battery device is smaller than a predetermined voltage, the power state machine transits from the operating status into the battery fault and process status. If a time during the supply voltage of the battery device is smaller than a predetermined voltage is smaller than a second predetermined time, the power state machine transits from the battery fault and process status into the operating status.

In one embodiment, the power state machine further includes a power off status for turning off a power of the central processing unit and the programmable logic device.

In one embodiment, the power state machine further includes a programmable logic device enabling status for providing power to the programmable logic device.

In one embodiment, the power state machine further includes a power pre-enabling status for preparing to provide power to the central processing unit.

In one embodiment, the main computer further includes a watchdog timer coupled to the programmable logic device and the central processing unit.

In one embodiment, the power state machine further includes a watchdog timer reset status for resetting the central processing unit.

In one embodiment, the vehicle is a car.

According to an exemplary embodiment of the present invention, a power management method applied to a main computer for a vehicle is provided. The main computer includes a central processing unit, a programmable logic device, and a peripheral component. The power management method includes establishing a power state machine in the programmable logic device, and managing power statuses of the main computer by the power state machine, wherein the power state machine comprises a turn-off status, an operating status, and an idle status located between the turn-off status and the operating status.

In one embodiment, the power state machine further includes a battery fault status.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
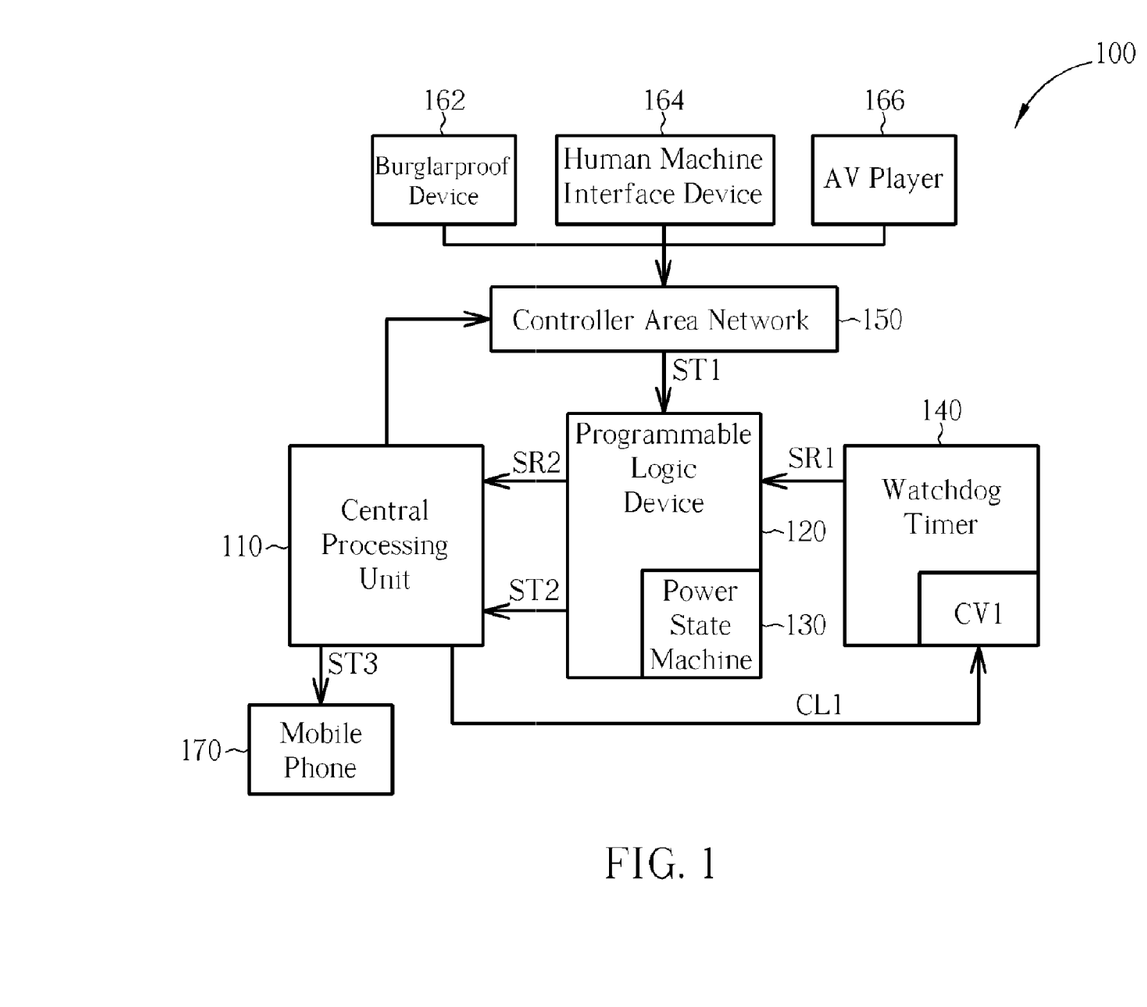
FIG. 1 is a block diagram of a main computer for a vehicle according to an embodiment of the present invention.

Please refer to FIG. 1. FIG. 1 is a block diagram of a main computer 100 for a vehicle according to an embodiment of the present invention. The main computer 100 includes a central processing unit 110, a programmable logic device 120, a power state machine 130, a watchdog timer 140, a controller area network (CAN) 150, a burglarproof device 162, a human machine interface (HMI) device 164, an AV player 166, and a mobile phone 170. Please be noted that the system configuration shown in FIG. 1 is merely for illustration, and should not be a limitation of the present invention. The central processing unit 110 is configured for controlling operations of the main computer 100. The programmable logic device 120 is coupled to the central processing unit 110. The power state machine 130 is built-in to the programmable logic device 120 and is configured for controlling the central processing unit 110 and managing power statuses of the main computer 100.

Please continue referring to FIG. 1. The watchdog timer 140 is coupled to the programmable logic device 120 and the central processing unit 110 for receiving a clear command CL1 transmitted periodically from the central processing unit 110 and for periodically clearing a count value CV1 according to the clear command CL1. When the count value CV1 reaches a predetermined value, a reset indicating signal SR1 is outputted to the programmable logic device 120 by the watchdog timer 140. At this time, the programmable logic device 120 outputs a reset command SR2 to the central processing unit 110 to notify that the main computer 100 needs to be reset. That is, when the count value CV1 reaches (equals or exceeds) the predetermined value, which means the central processing unit 110 does not operate normally to output the clear command CL1, the central processing unit 110 may be in a crash status and needs to be reset. Thus the watchdog timer 140 outputs the reset indicating signal SR1 to the programmable logic device 120 to indicate that the central processing unit 110 does not operate normally. As shown in FIG. 1, the controller area network 150 is coupled to the programmable logic device 120, and the burglarproof device 162, the human machine interface device 164, and the AV player 166 are coupled to the programmable logic device 120 through the controller area network 150. The mobile phone 170 is coupled to the central processing unit 110. The operations among the burglarproof device 162, the human machine interface device 164 (which can include devices such as a display device and input control components), the AV player 166, the central processing unit 110, the mobile phone 170, and the programmable logic device 120 are detailed in the following embodiments.

Please be noted that the programmable logic device 120 can be implemented by a complex programmable logic device (CPLD), but is not limited to this only and can be implemented using programmable logic devices of other types. In one embodiment, the vehicle is a car and the main computer 100 is a car PC applied in the car, but this is merely an example for describing features of the present invention and should not be viewed as a limitation of the present invention.

Figure 2:
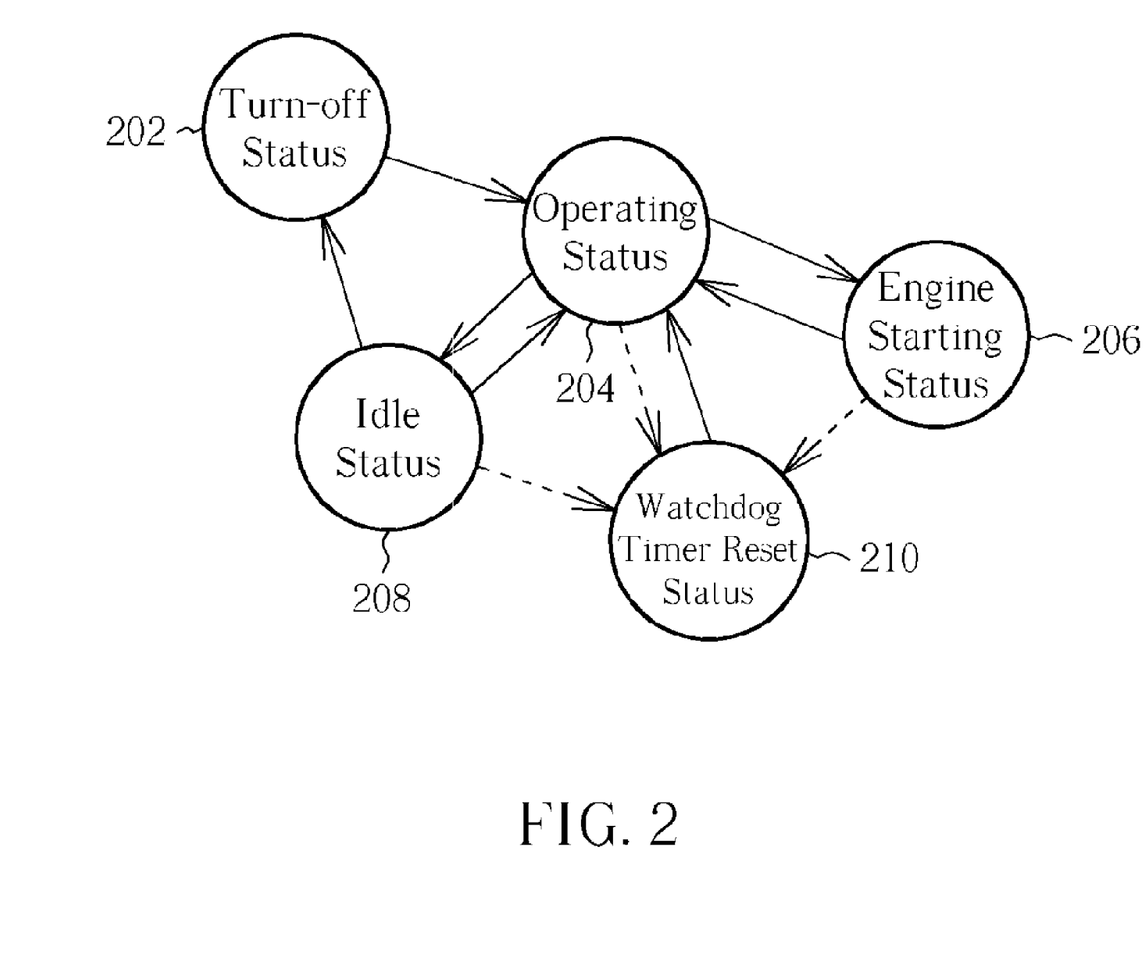
FIG. 2 is a diagram illustrating an operating example of the power state machine shown in FIG. 1.

Please refer to FIG. 2. FIG. 2 is a diagram illustrating an operating example of the power state machine 130 shown in FIG. 1. The power state machine 130 includes, but is not limited to, a turn-off status 202, an operating status 204, an engine starting status 206, an idle status 208, and a watchdog timer reset status 210. Please refer to FIG. 2 together with FIG. 1 for further describing the operations of the power state machine 130. In this embodiment, the main computer 100 is a car PC applied to a car. The abovementioned turn-off status 202 represents a status in which the main computer 100 is not turned on yet. In the turn-off status 202, the central processing unit 110 is turned off, and only a part of the components (such as the programmable logic device 120, the controller area network 150, the burglarproof device 162, and the mobile phone 170) are turned on for standby processing events, which are detailed in the paragraph that follows. When a user starts the car to turn on the main computer 100, the state machine 130 transits from the turn-off status 202 into the operating status 204. In the operating status 204, the main computer 100 is turned on and operates normally, and all the components 110, 120, 140, 150, 162, 164, 166, and 170 included in the main computer 100 are also turned on. The programmable logic device 120 in the operating status 204 operates normally and can manage the power statuses of the main computer 100 through the power state machine 130. The engine starting status 206 represents a status of starting engine. That is, when the user starts the engine, at this time, the power state machine 130 of the programmable logic device 120 turns off the power of some peripheral components. For example, the power of the human machine interface device 164 and the AV player 166 are turned off to reserve more power for starting the engine. At this time, the power state machine 130 transits from the operating status 204 into the engine starting status 206. After the engine is started, the power state machine 130 switches back to the operating status 204.

In the prior art, when the user turns off the car (i.e., turning off the engine and the power), the main computer is powered off directly. If the user needs to leave for only a few minutes and will restart the car, it wastes much time in restarting the main computer (i.e., transiting from the turn-off status into the operating status), which is not convenient for the user. Therefore, through an embodiment of the invention, the idle status 208 is added between the operating status 204 and the turn-off status 202 to solve such problem. It is assumed that the power state machine 130 is in the operating status 204 in the beginning. If a main computer power off signal generated by turning off the engine and power is received by the programmable logic device 120 in the operating status 204, the power state machine 130 transits from the operating status 204 into the idle status 208 without entering directly into the turn-off status 202. If the time during staying in the idle status 208 is greater than a first predetermined time T1, the power state machine 130 transits from the idle status 208 into the turn-off status 202. However, if the time during staying in the idle status 208 is within the first predetermined time T1 and the programmable logic device receives a main computer power on signal, the power state machine 130 transits from the idle status 208 back into the operating status 204 to quickly enable the power management mechanism. Therefore, when the user turns off the car, the power state machine 130 transits from the operating status 204 into the idle status 208. At this time, the human machine interface device 164 and the AV player 166 are turned off to lower the power consumption of the main computer 100. If the user only leaves for a few minutes and restarts the car within the first predetermined time T1, the power state machine 130 transits from the idle status 208 into the operating status 204. If the user does not restart the car for a longer period of time exceeding the first predetermined time T1, the power state machine 130 transits from the idle status 208 into the turn-off status 202.

It is assumed that when the power state machine 130 is in the operating status 204, the power consumption of the main computer 100 corresponds to a first power value P1; when the power state machine 130 is in the idle status 208, the power consumption of the main computer 100 corresponds to a second power value P2; and when the power state machine 130 is in the turn-off status 202, the power consumption of the main computer 100 corresponds to a third power value P3. The relationship among the three power values is P1>P2>P3. Hence, when the user turns off the car, as abovementioned, the power state machine 130 transits from the operating status 204 into the idle status 208 first. Therefore, within the first predetermined time T1, not only can the power consumption be lowered but the operating status 204 can also be returned soon when the user restarts the car.

Please keep referring to FIG. 2. In an embodiment of the present invention, the watchdog timer reset status 210 is further established into the power state machine 130 for resetting the main computer 100. Please refer to FIG. 1 again for a simple illustration. It is assumed that the power state machine 130 stays in any one of the operating status 204 and the engine starting status 206 in the beginning. If the central processing unit 110 stops operating normally in the operating status 204 or the engine starting status 206, the watchdog timer 140 can't receive the clear command CL1 transmitted from the central processing unit 110. Thus the count value CV1 can't be cleared periodically. When the count value CV1 reaches the predetermined value, the watchdog timer 140 outputs the reset indicating signal SR1 to the programmable logic device 120. When the programmable logic device 120 receives the reset indicating signal SR1, the power state machine 130 enters the watchdog timer reset status 210. At this time, the programmable logic device 120 outputs the reset command SR2 to reset the central processing unit 110. After the central processing unit 110 is reset, the power state machine 130 transits from the watchdog timer reset status 210 into the operating status 204. Therefore, through getting into the watchdog timer reset status 210 to reset the central processing unit 110, the main computer 100 can restore normal operation (i.e., the operating status 204). In other words, through the function of monitoring the operations of the central processing unit 110 provided by the watchdog timer 140, the stability of the main computer 100 can be substantially improved.

Figure 3:
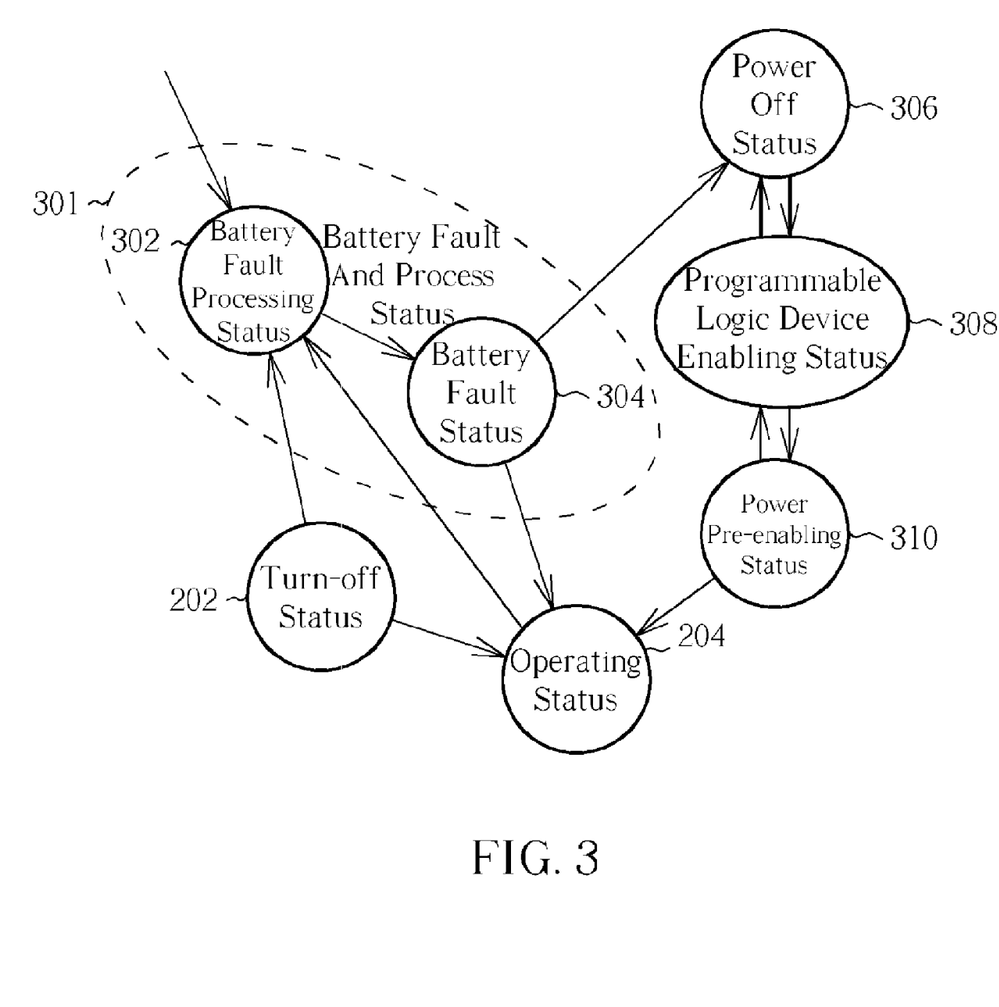
FIG. 3 is a diagram illustrating another operating example of the power state machine shown in FIG. 1.

Please refer to FIG. 3. FIG. 3 is a diagram illustrating another operating example of the power state machine 130 shown in FIG. 1. The power state machine 130 includes, but is not limited to, the turn-off status 202, the operating status 204, a battery fault and process status 301, a power off status 306, a programmable logic device enabling status 308, and a power pre-enabling status 310. The battery fault and process status 301 further includes a battery fault processing status 302 and a battery fault status 304. In this embodiment, when a supply voltage of a battery device (such as a 12V car battery) is lower than a predetermined voltage (for example, 7.7V), the power state machine 130 transits directly from the current status into the battery fault processing status 302 of the battery fault and process status 301.

It is assumed that the power state machine 130 stays in the operating status 204 in the beginning. If the supply voltage of the battery device in the operating status 204 is detected to be lower than the predetermined voltage, the power state machine 130 transits from the operating status 204 into the battery fault and process status 301. Descriptions are divided into two steps below. First, the power state machine 130 gets into the battery fault processing status 302 for backing up existing data or system setting values into a storage (such as a flash memory) to prevent from data loss or system setting value loss. After a predetermined time, the power state machine 130 gets into the battery fault status 304 to turn off the power of some components in the main computer 100. For example, when the power state machine 130 gets into the battery fault status 304, except for the programmable logic device 120, a real-time clock (RTC) generator, and storages (such as DDR memories), other components 110, 140, 150, 162, 164, 166, and 170 of the main computer 100 are turned off and stop operating. When a time during the supply voltage of the battery device is smaller than a predetermined voltage is smaller than a second predetermined time T2, the voltage drop of the supply voltage is viewed as a temporary event. At this time, the power state machine 130 transits from the battery fault status 304 into the operating status 204 and the power provided for other components is recovered. When the time during the supply voltage of the battery device is smaller than a predetermined voltage is greater than the second predetermined time T2, the battery device is determined as having insufficient power. Hence, the power state machine 130 transits from the battery fault status 304 into the power off status 306 for turning off the power of the main computer 100. At this time, all the components 110, 120, 140, 150, 162, 164, 166 and 170 of the main computer 100 are turned off. In other embodiments of the present invention, if the power state machine 130 transits from the turn-off status 202 into the battery fault and process status 301, the power state machine 130 returns from the battery fault and process status 301 back into the turn-off status 202 again if the voltage change of the supply voltage is viewed as a temporary event.

It is assumed that when the power state machine 130 stays in the operating status 204, the supply voltage of the battery device corresponds to a first voltage value V1; and when the power state machine 130 stays in the battery fault status 304, the supply voltage of the battery device corresponds to a second voltage value V2. The relationship between the two voltage vales is V2<V. Therefore, through the battery fault processing status 302 and the battery fault status 304, not only can existing data and system setting values be backed up to prevent from data loss but whether the supply voltage of the battery device is really in insufficient power can also be determined, and corresponding handling can thereby be done.

Please keep referring to FIG. 3. After getting into the power off status 306, the programmable logic device 120 and the power state machine 130 can be initiated if the user replaces a new battery device. In the following, descriptions are divided into two situations. In a first situation, when the supply voltage of the new battery device reaches a predetermined voltage (such as 7.7V or other voltage), the power state machine 130 transits from the power off status 306 into the programmable logic device enabling status 308 for providing power to the programmable logic device 120 and turning on the programmable logic device 120. If a time during the supply voltage of the new battery device reaches the predetermined voltage is greater than a third predetermined time T3, the power state machine 130 transits from the programmable logic device enabling status 308 into the power pre-enabling status 310 for preparing to provide power to the components 110, 120, 140, 150, 162, 164, 166, and 170 of the main computer 100 except for the programmable logic device 120. If later the programmable logic device 120 receives a main computer power on signal generated by starting the engine and turning on power, the power state machine 130 transits from the power pre-enabling status 310 into the operating status 204. In a second situation, when the supply voltage of the new battery device reaches the predetermined voltage, the power state machine 130 transits from the power off status 306 into the programmable logic device enabling status 308. If the supply voltage of the new battery device drops below the predetermined voltage again, and the time during the supply voltage of the new battery device is smaller than the predetermined voltage is greater than a fourth predetermined time T4, the power state machine 130 transits from the programmable logic device enabling status 308 back into the power off status 306. If the time during the supply voltage of the new battery device reaches the predetermined voltage is greater than a fifth predetermined time T5, the power state machine 130 moves from the programmable logic device enabling status 308 into the power pre-enabling status 310. After that, if the supply voltage of the battery device drops below the predetermined voltage again, the power state machine 130 transits from the power pre-enabling status 310 into the programmable logic device enabling status 308.

Figure 4:
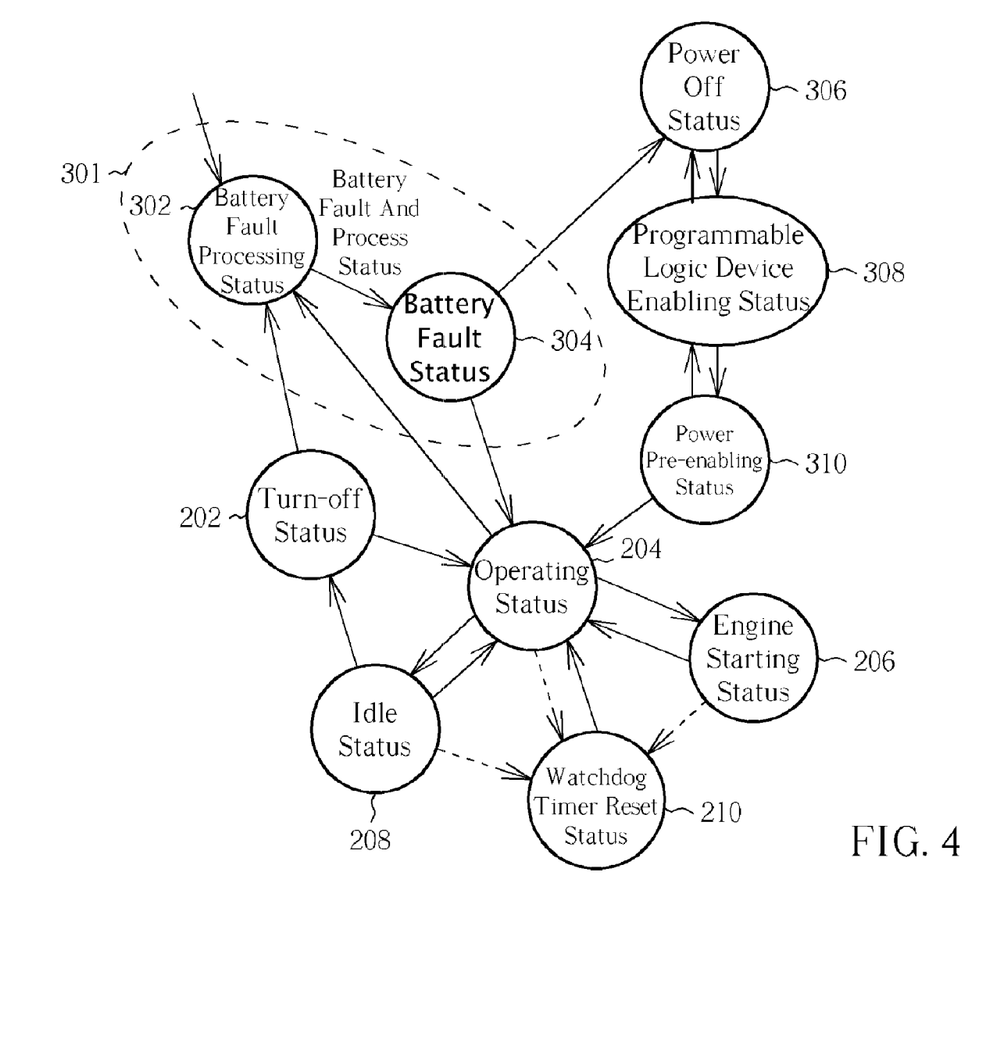
FIG. 4 is a diagram illustrating another operating example of the power state machine shown in FIG. 1.

Of course, the abovementioned power statuses of the power state machine 130 are exemplary embodiments of the present invention. In other embodiments, more functions are designed into the power state machine 130 to provide the main computer 100 with more power control choices. For example, all the functions shown in FIG. 2 and FIG. 3 can be combined into the same power state machine 130. Please refer to FIG. 4. FIG. 4 is a diagram illustrating another operating example of the power state machine shown in FIG. 1. As shown in FIG. 4, the lower part of the figure includes the turn-off status 202, the operating status 204, the engine starting status 206, the idle status 208, and the watchdog timer reset status 210 mentioned in FIG. 2, and the upper part of the figure includes the battery fault and process status 301, the power off status 306, the programmable logic device enabling status 308, and the power pre-enabling status 310 mentioned in FIG. 3. As the details and the operations of each status are already described in FIG. 2 and FIG. 3, further description is omitted here for brevity.

Please keep referring to FIG. 1. In the following, one example is given for illustrating how each component shown in FIG. 1 and the programmable logic device 120 are put into use.

In a first application, it is assumed that the user is not in the car and the main computer 100 is in the turn-off status 202. If a thief enters the car and triggers the burglarproof device 162, the burglarproof device 162 transmits a power on signal ST1 to the programmable logic device 120 through the controller area network 150. At this time, the power state machine transits from the turn-off status 202 into the operating status 204 so as to turn on the central processing unit 110. The programmable logic device 120 then transmits an indicating signal ST2 to the central processing unit 110, and the central processing unit 110 transmits a control signal ST3 to the mobile phone 170 to notify the mobile phone to send out a warning message to the user.

The embodiments above are presented merely for describing applications of the present invention, and in no way should be considered to be limitations of the scope of the present invention. It will be obvious to those skilled in the art that various modifications of the applications of the programmable logic device 120 may be made without departing from the spirit of the present invention.

The abovementioned embodiments are presented merely for describing the present invention, and in no way should be considered to be limitations of the scope of the present invention. The abovementioned programmable logic device 120 can be implemented by a complex programmable logic device (CPLD), but is not limited to this only and can be implemented using programmable logic devices of other types. In one embodiment, the vehicle is a car and the main computer 100 is a car PC applied in the car, but this is merely an example for describing features of the present invention and is not a limitation of the present invention. The abovementioned burglarproof device 162, the human machine interface device 164, the AV player 166, and the mobile phone 170 are optional elements and are merely used for illustrating the applications of the present invention. Those skilled in the art should know that other elements can be put in use with the programmable logic device 120. Please be noted that the power statuses of the power state machine 130 are not limited to the embodiments disclosed in the present invention only, and more power statuses can be designed into the power state machine 130 to provide the main computer 100 with more functions.

In summary, the present invention provides the main computer 100 for a vehicle (such as a car) and related power management method. Through establishing the power state machine 130 in the programmable logic device 120, the power statuses of the main computer 100 can be edited and managed easily. In addition, because the idle status 208 is additionally added between the operating status 204 and the turn-off status 202, the power state machine 130 transits from the operating status 204 into the idle status 208 without getting directly into the turn-off status 202 when the user turns off the car (i.e., turning off the engine and power). At this time, the power consumption of the main computer 100 in the idle status 208 is small and the power state machine 130 can return back to the operating status 204 soon when the user restarts the car. Furthermore, if the central processing unit 110 crashes, the power state machine 130 can enter the watchdog timer reset status 210 to reset the main computer 100, and the stability of the main computer 100 can thereby be substantially improved. If a situation occurs where the supply voltage of the battery device has insufficient power, not only can existing data and system setting values be backed up to prevent from data loss but information on whether the supply voltage of the battery device really has insufficient power can also be determined through the battery fault processing status 302 and the battery fault status 304. Corresponding handling can therefore be done. Through the main computer 100 and related power management method disclosed in the present invention, it is not only time-saving, power-saving, and convenient, but also eliminating system crashes or unstable situations can provide more choices to the user.

Those skilled in the art will readily observe that numerous modifications and alterations of the device and method may be made while retaining the teachings of the invention.

What is claimed is:

1. A main computer for a vehicle, comprising:
 a central processing unit, for controlling operations of the main computer; and
 a programmable logic device, coupled to the central processing unit, the programmable logic device having a built-in power state machine for managing power statuses of the main computer, wherein the power state machine comprises a turn-off status, an operating status, and a battery fault and process status located between the turn-off status and the operating status; and
 a battery device;
 wherein when the supply voltage of the battery device is smaller than a predetermined voltage, the power state machine transits from the operating status into the battery fault and process status; and
 wherein when a time during the supply voltage of the battery device is smaller than the predetermined voltage is smaller than a first predetermined time, the power state machine transits from the battery fault and process status into the operating status;
 wherein the power state machine further comprises a power off status for turning off a power of the central processing unit and the programmable logic device; and when the time during the supply voltage of the battery device is smaller than the predetermined voltage is greater than the first predetermined time, the power state machine transits from the battery fault and process status into the power off status;
 wherein the power state machine further comprises a programmable logic device enabling status for providing power to the programmable logic device; and when the supply voltage of the battery device reaches the predetermined voltage, the power state machine transits from the power off status into the programmable logic device enabling status;
 wherein the power state machine further comprises a power pre-enabling status for preparing to provide power to the central processing unit; and when a time during the supply voltage of the battery device reaches the predetermined voltage is greater than a second predetermined time, the power state machine transits from the programmable logic device enabling status into the power pre-enabling status;

wherein when the programmable logic device receives a main computer power on signal, the power state machine transits from the power pre-enabling status into the operating status.

2. The main computer of claim 1, wherein a transition between the turn-off status and the operating status is enabled according to a first status transition condition, and a transition between the turn-off status and the battery fault and process status is enabled according to a second status transition condition.

3. The main computer of claim 2, wherein:
when the power state machine is in the operating status, a supply voltage of the battery device corresponds to a first voltage value;
when the power state machine is in the battery fault and process status, the supply voltage of the battery device corresponds to a second voltage value, wherein the second voltage value is smaller than the first voltage value.

4. The main computer of claim 1, wherein when the supply voltage of the battery device is smaller than the predetermined voltage and the time during the supply voltage of the battery device is smaller than the predetermined voltage is greater than a third predetermined time, the power state machine transits from the programmable logic device enabling status into the power off status.

5. The main computer of claim 1, wherein when the supply voltage of the battery device is smaller than the predetermined voltage, the power state machine transits from the power pre-enabling status into the programmable logic device enabling status.

6. The main computer of claim 1, wherein the battery fault and process status comprises a battery fault processing status and a battery fault status; and when the supply voltage of the battery device is smaller than the predetermined voltage, the power state machine enters into the battery fault processing status to backup data and then enters into the battery fault status after a third predetermined time to turn off a power of the central processing unit.

7. The main computer of claim 1 further comprising:
a watchdog timer, coupled to the programmable logic device and the central processing unit, for counting a count value, wherein when the count value reaches a predetermined value, the watchdog timer outputs a reset indicating signal to the programmable logic device and the programmable logic device outputs a reset command to reset the central processing unit.

8. The main computer of claim 7, wherein the power state machine further comprises a watchdog timer reset status for resetting the central processing unit; when the programmable logic device receives the reset indicating signal, the power state machine gets into the watchdog timer reset status; and after the central processing unit is reset, the power state machine transits from the watchdog timer reset status into the operating status.

9. A power management method applied to a main computer for a vehicle, the main computer comprising a central processing unit, a programmable logic device, a battery device, and a peripheral component, the method comprising:
establishing a power state machine in the programmable logic device, wherein the power state machine comprises a turn-off status, a power off status, a programmable logic device enabling status for providing power to the programmable logic device, a power pre-enabling status for preparing to provide power to the central processing unit, an operating status, and an idle status located between the turn-off status and the operating status; and managing power statuses of the main computer through the power state machine;
transiting from the operating status into the idle status when the programmable logic device receives a main computer power off signal;
transiting from the idle status into the turn-off status if a time during staying in the idle status is greater than a first predetermined time, wherein when the power state machine is in the turn-off status, the central processing unit and the peripheral component are turned off;
when a supply voltage provided by the battery device reaches a first predetermined voltage, transiting from the power off status into the programmable logic device enabling status; and
when a time during the supply voltage reaches the first predetermined voltage is greater than a second predetermined time, transiting from the programmable logic device enabling status into the power pre-enabling status;
wherein when the programmable logic device receives a main computer power on signal, transiting from the power pre-enabling status into the operating status.

10. The power management method of claim 9, wherein:
when the power state machine is in the operating status, the central processing unit, the programmable logic device, and the peripheral component are turned on, and a power consumption of the main computer corresponds to a first power value;
when the power state machine is in the idle status, the power consumption of the main computer corresponds to a second power value;
when the power state machine is in the turn-off status, the central processing unit and the peripheral component are turned off, and the power consumption of the main computer corresponds to a third power value; wherein the second power value is between the first power value and the third power value.

11. The power management method of claim 9, further comprising:
transiting from the idle status into the operating status when the programmable logic device receives the main computer power on signal.

12. The power management method of claim 10, wherein the power state machine further comprises a battery fault and process status and the method further comprises:
entering into the battery fault and process status if the supply voltage is smaller than a second predetermined voltage; wherein the central processing unit is turned off in the battery fault and process status.

13. The power management method of claim 12, further comprising:
transiting from the battery fault and process status into the operating status if a time during the supply voltage is smaller than the second predetermined voltage is smaller than a third predetermined time.

14. The power management method of claim 13, further comprising:
transiting from the battery fault and process status into the power off status if the time during the supply voltage is greater than the second predetermined voltage is smaller than the third predetermined time; wherein the central processing unit, the programmable logic device, and the peripheral component are turned off in the power off status.

15. The power management method of claim 9, wherein the programmable logic device is turned on in the programmable logic device enabling status.

16. The power management method of claim 15, further comprising:
transiting from the programmable logic device enabling status into the power off status when the supply voltage is smaller than the first predetermined voltage and the time during the supply voltage is smaller than the first predetermined voltage is greater than a third predetermined time.

17. The power management method of claim 9, wherein the power state machine further comprises a watchdog timer reset status and the method further comprises:
generating a count value;
entering into the watchdog timer reset status to reset the central processing unit when the count value reaches a predetermined value; and
transiting from the watchdog timer reset status into the operating status after resetting the central processing unit.

18. A main computer for a vehicle, comprising:
a central processing unit, for controlling operations of the main computer;
a programmable logic device, coupled to the central processing unit, the programmable logic device having a built-in power state machine for managing power statuses of the main computer, wherein the power state machine comprises a turn-off status, a power off status, a programmable logic device enabling status for providing power to the programmable logic device, a power pre-enabling status for preparing to provide power to the central processing unit, an operating status, and an idle status located between the turn-off status and the operating status; and
a battery device for providing a supply voltage;
wherein when the power state machine is in the operating status, a power consumption of the main computer corresponds to a first power value; when the power state machine is in the idle status, the power consumption of the main computer corresponds to a second power value; when the power state machine is in the turn-off status, the power consumption of the main computer corresponds to a third power value; and the second power value is between the first power value and the third power value;
wherein when the programmable logic device receives a main computer power off signal, the power state machine transits from the operating status into the idle status;
wherein when a time during staying in the idle status is greater than a first predetermined time, the power state machine transits from the idle status into the turn-off status,
wherein when the power state machine is in the turn-off status, the central processing unit and the peripheral component are turned off;
wherein when the supply voltage reaches a first predetermined voltage, the power state machine transits from the power off status into the programmable logic device enabling status.
wherein when a time during the supply voltage reaches the first predetermined voltage is greater than a second predetermined time, the power state machine transits from the programmable logic device enabling status into the power pre-enabling status;
wherein when the programmable logic device receives a main computer power on signal, the power state machine transits from the power pre-enabling status into the operating status.

19. The main computer of claim 18, wherein when a time during staying in the idle status is smaller than the first predetermined time and the programmable logic device receives the main computer power on signal, the power state machine transits from the idle status into the operating status.

* * * * *